Dec. 15, 1931.    W. F. RIEGER    1,837,069
CONVEYER WORM PROTECTIVE DEVICE

Filed Nov. 11, 1929

INVENTOR
Wm. F. Rieger
BY
Murray O. Hayes
ATTORNEY

Patented Dec. 15, 1931

1,837,069

UNITED STATES PATENT OFFICE

WILLIAM F. RIEGER, OF SALT LAKE CITY, UTAH, ASSIGNOR, BY MESNE ASSIGNMENTS, TO THE STOKER MATIC CORPORATION, OF SALT LAKE CITY, UTAH, A CORPORATION OF UTAH

CONVEYER WORM PROTECTIVE DEVICE

Application filed November 11, 1929. Serial No. 406,392.

This invention relates to a device to be applied to a conveyer worm, to remove from the material being conveyed thereby, objects of such size and/or shape that they would damage such conveyer or prevent its operation, if admitted to the conveyer tube, and to effectuate such removal before entry of such objects to the said tube.

This invention has among its objects to provide a simple, cheap, yet unfailingly effective means to remove deleterious objects from material being handled by a screw conveyer, and so to construct it that it may be applied to any conveyer worm whether new or old, and regardless of the kind of use to which such conveyer is put.

Figure 1:
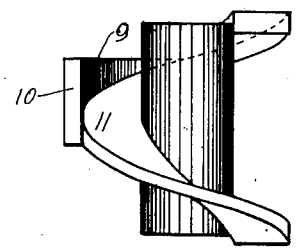
Fig. 1 is a side view of a section of conveyer worm with my present invention applied thereto.
Figure 2:
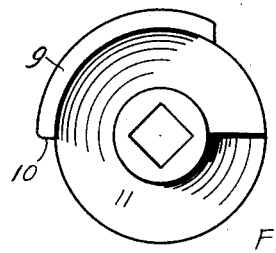
Fig. 2 is an end view thereof.
Figure 3:
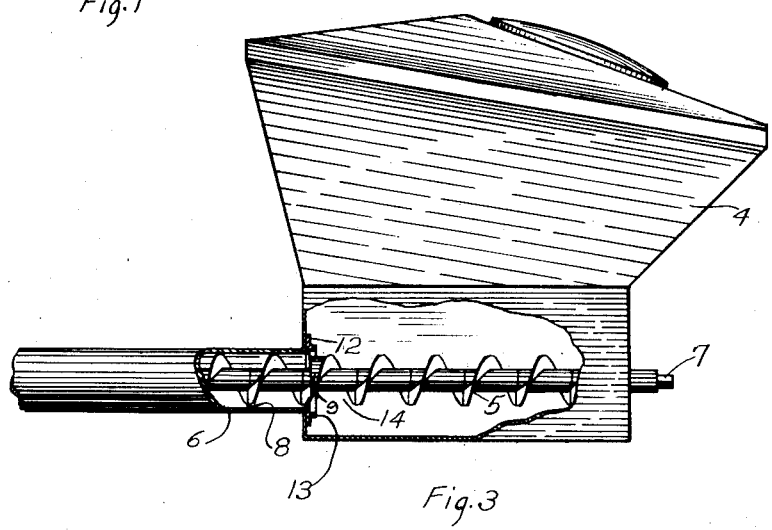
Fig. 3 is a side elevation, with parts of the enclosing structure cut away, of a conveyer embodying my invention.

The stoppage of screw conveyers from operating, and the breakage of parts thereof, through the admission to such conveyers of objects of such size or shape that the mechanism can not handle them, is a source of no small expense and inconvenience, and it is to eliminate these undesirable occurrences that the present invention is made. For instance, the presence of bolts or railroad spikes in coal that is to be fed by the worm conveyer of a stoking mechanism, is a frequent source of vexatious and costly shut-downs of such devices.

The application of this invention chosen for illustration is a stoker intended to handle the smaller sizes of coal, but it is to be understood that this is only one use therefor. The coal is charged into hopper 4, whence it moves down into contact with worm or screw 5, said worm extending into tube or conduit 6 which leads to a suitable combustion device (not shown); the shaft of worm 5 is shaped to be connected to a driving mechanism at 7. Sufficient clearance is left between worm 5 and tube 6 so that small foreign objects may be passed through, as indicated at 8.

Although the worm in the present instance is shown as being made up of sections, it may be of one piece.

A piece of metal 9 is fixed to the helical rib of the worm in such position that it revolves in the mouth of tube 6. The said piece 9 is curved to the same radius as the said rib, but if flattened out it would be acutely triangular in outline, and the base or abutment face thereof is disposed to face in the direction of rotation of the said worm, said base being designated by 10 and the rib by 11. Preferably a collar 12 with a cylindrical flange 13 projecting over worm 5 is positioned at the mouth of tube 6 to protect said tube, but this is not essential.

In worm or screw conveyers to which the present invention relates, breakage or damage to the worm or associated parts frequently results owing to objects wedging between the helical rib of the worm and the edge or mouth of the tube. Such wedging may occur in a definite zone immediately in front of the mouth of the tube. By securing the so-called attachment or piece of metal 9, having the abutment face 10, to the edge of the rib of the worm defining this zone, the space between the edge of the mouth of the tube and that portion of a turn of the helix immediately in front of the tube entrance is effectively closed, thereby positively preventing any wedging or jamming from taking place.

When an object of such size or shape that the worm 5 can not readily handle it falls down near the mouth of tube 6, or is carried to that position in the coal, it does not pass entirely into said tube, but lies with a part thereof outside the mouth of said tube; when base 10 comes around to said object it engages said object and pushes it down into space 14 below worm 5; that this action occurs has been repeatedly demonstrated by placing bolts, nuts, scrap iron, railroad spikes, etc., in coal being fed by a conveyer constructed in accordance with the invention. Piece 9 may be made integral with rib 11, or it may be made separate and fixed to said rib by welding or other suitable means. A covered hand hole may be provided to give access to space 14 if desired, to facilitate removal of such foreign objects as may be there accumulated. Placing piece 9 on the edge of rib 11 insures that said piece will always contact a foreign object before said rib does, because of the smaller diameter of the latter, and hence there can be no binding of said rib against such object.

I claim:

1. In a conveyer mechanism, a worm, an enclosure therefor, and abutment means carried by and extending along the peripheral face of said worm to engage and move objects lying adjacent the mouth of said enclosure.

2. In a conveyer mechanism, a worm, and enclosure therefor, and an element carried by said worm adjacent the mouth of said enclosure, said element presenting in the direction of rotation of said worm an abutment face of rectilinear form extending substantially parallel to the axis of said worm.

3. In a conveyer, a worm, said worm comprising a helical rib, a tube in which said worm is mounted, and abutment means carried by the peripheral face of said rib adjacent the mouth of said tube so as to present a longitudinally extending surface operable in the space between the worm and tube to engage and move objects lying adjacent said mouth.

4. In a conveyer mechanism, a worm, said worm comprising a helical rib, a tube in which said worm is mounted, and an element mounted on the edge of said rib, said element presenting in the direction of said worm's rotation an abutment face substantially parallel to the axis of said worm.

5. In a conveyer mechanism, a worm, a tube in which said worm is mounted, and a substantially triangular element mounted on the periphery of said worm adjacent the mouth of said tube, and constituting a guarding closure whereby to prevent wedging of objects between the mouth of said tube and worm.

6. In a conveyer mechanism, a worm, said worm comprising a helical rib, a tube in which said worm is mounted, and a substantially triangular member mounted on the peripheral edge of said rib and extending between said rib and the entrance of the tube, the base of said triangle being presented in the direction of rotation of said worm.

7. In a conveyer mechanism, a worm, said worm comprising a helical rib, and a substantially triangular member mounted on and extending along the peripheral face of said rib.

8. In a conveyer mechanism, a tube, a worm mounted in said tube, a collar mounted adjacent the mouth of said tube, said collar having a cylindrical flange extending in the direction of the length of said worm and lying around said worm, and an element fixed to said worm to revolve within said flange, said element having an abruptly projecting portion.

9. In a conveyer mechanism, a tube, a worm in said tube, said worm comprising a helical rib, a collar mounted adjacent the mouth of said tube, said collar having a cylindrical flange extending parallel to the axis of said worm and lying around said worm, and a substantially triangular element fixed to said rib to revolve within said flange.

10. In a conveyer mechanism, a tube, a worm in said tube, said worm comprising a helical rib, a collar mounted adjacent the mouth of said tube, said collar having a cylindrical flange extending parallel to the axis of said worm and lying around said worm, and a substantially triangular element fixed to the edge of said rib to revolve within said flange, the base of said element being presented in the direction of rotation of said worm.

11. In a conveyer mechanism, a conduit, a worm extending thereinto, and means on said worm for positively excluding the entrance of objects into said conduit in the zone immediately adjacent to the mouth of the conduit and eliminating wedging of the objects between the worm and conduit.

12. In a conveyer mechanism, a conduit, a worm extending thereinto, said worm including a helical rib, and means cooperating with the mouth of said conduit and movable with said helical rib for inclosing that portion of the zone immediately adjacent to the mouth of the conduit where wedging of objects between the worm and conduit normally tends to occur.

13. In a conveyer mechanism, a conduit, a worm extending thereinto, said worm including a helical rib, and means cooperating with the mouth of said conduit and said helical rib for inclosing that portion of the zone immediately adjacent to the mouth of the conduit where wedging of objects between the worm and conduit normally tends to occur, said means being carried by the peripheral edge of said helical rib.

14. In a conveyer mechanism, a conduit, a worm extending thereinto, said worm including a helical rib, and means cooperating with the mouth of said conduit and said helical rib for inclosing that portion of the zone immediately adjacent to the mouth of the conduit where wedging of objects between the worm and conduit normally tends to occur, said means being carried by the peripheral edge of said helical rib and comprising an arcuate member extending between the said rib and conduit.

15. In a conveyer mechanism, a conduit, a worm extending thereinto, said worm including a helical rib, and means cooperating with the mouth of said conduit and said helical rib for inclosing that portion of the zone immediately adjacent to the mouth of the conduit where wedging of objects between the worm and conduit normally tends to occur, said means being carried by the peripheral edge of said helical rib and comprising an arcuate member extending substantially perpendicular to the plane of the rib between the said rib and conduit.

16. In a conveyer mechanism, a conveyer worm including a helical rib, a conduit associated therewith, and abutment means carried by and extending along the peripheral edge of said rib for a fractional part of a turn, said means being adapted to prevent objects from wedging against the edge of said conduit.

17. An attachment for a conveyer worm which comprises an elongated triangular member bent to conform to the curvature of said worm and adapted to be secured along the peripheral edge thereof.

WILLIAM F. RIEGER.